United States Patent
Lee et al.

(10) Patent No.: US 11,115,981 B2
(45) Date of Patent: Sep. 7, 2021

(54) METHOD AND APPARATUS FOR ALLOCATING RESOURCE BASED ON ANCHOR CARRIER IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 16/626,826

(22) PCT Filed: Jul. 24, 2018

(86) PCT No.: PCT/KR2018/008369
§ 371 (c)(1),
(2) Date: Dec. 26, 2019

(87) PCT Pub. No.: WO2019/022480
PCT Pub. Date: Jan. 31, 2019

(65) Prior Publication Data
US 2020/0137756 A1    Apr. 30, 2020

Related U.S. Application Data

(60) Provisional application No. 62/536,982, filed on Jul. 25, 2017.

(51) Int. Cl.
*H04W 72/04*     (2009.01)
*H04W 4/40*      (2018.01)
*H04W 72/08*     (2009.01)

(52) U.S. Cl.
CPC ......... *H04W 72/0453* (2013.01); *H04W 4/40* (2018.02); *H04W 72/085* (2013.01)

(58) Field of Classification Search
CPC ... H04W 4/40; H04W 4/42–48; H04W 36/00; H04W 36/0055; H04W 36/0058;
(Continued)

(56) References Cited

U.S. PATENT DOCUMENTS

2011/0111785 A1    5/2011  Lindoff et al.
2021/0127362 A1*   4/2021  Jin ........................ H04W 76/11
2021/0136744 A1*   5/2021  Lu ........................ H04W 92/18

FOREIGN PATENT DOCUMENTS

WO    2016117936    7/2016

OTHER PUBLICATIONS

ZTE, "Considering CA on PC5 carrier," 3GPP TSG-RAN WG1 #89, R1-1707211, May 2017, 3 pages.
(Continued)

*Primary Examiner* — Thomas R Cairns
(74) *Attorney, Agent, or Firm* — Lee, Hong, Degerman, Kang & Waimey

(57) ABSTRACT

A method and apparatus for allocating resources for a sidelink transmission in a wireless communication system is provided. A user equipment (UE) selects a first carrier, i.e. anchor carrier, among multiple carriers, and allocates a first resource on the first carrier. The UE allocates a second resource on a second carrier, i.e. non-anchor carrier, based on an offset from the first resource on the first carrier. The UE performs the sidelink transmission by using the first resource on the first carrier and the second resource on the second carrier.

16 Claims, 7 Drawing Sheets

(58) Field of Classification Search
CPC ......... H04W 36/0069; H04W 36/0072; H04W 36/0079; H04W 36/03; H04W 56/0045; H04W 72/02; H04W 72/0453; H04W 72/085
See application file for complete search history.

(56) References Cited

OTHER PUBLICATIONS

Catt, "Multi-Carrier Operation for Sidelink V2X," 3GPP TSG-RAN WG2 #96, R1-168109, Nov. 2016, 4 pages.
European Patent Office Application Serial No. 18838090.1, Search Report dated May 25, 2020, 8 pages.
PCT International Application No. PCT/KR2018/008369, International Search Report dated Nov. 28, 2018, 2 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0, Jun. 2017, 333 pages.
NEC, "Load balancing via dynamic resource sharing for multiple carriers and pools", 3GPP TSG RAN WG1 Meeting #87, R1-1611722, Nov. 2016, 6 pages.
3rd Generation Partnership Project (3GPP), "Technical Specification Group Radio Access Network; Evolved Universal Terrestrial Radio Access (E-UTRA); Physical layer procedures (Release 14)," 3GPP TS 36.213 V14.3.0, Jun. 2017, 66 pages.
NEC, "Load balancing across multiple carriers", 3GPP TSG RAN WG1 Meeting #88, R1-1701926, Feb. 2017, 4 pages.

* cited by examiner

[Fig. 1]
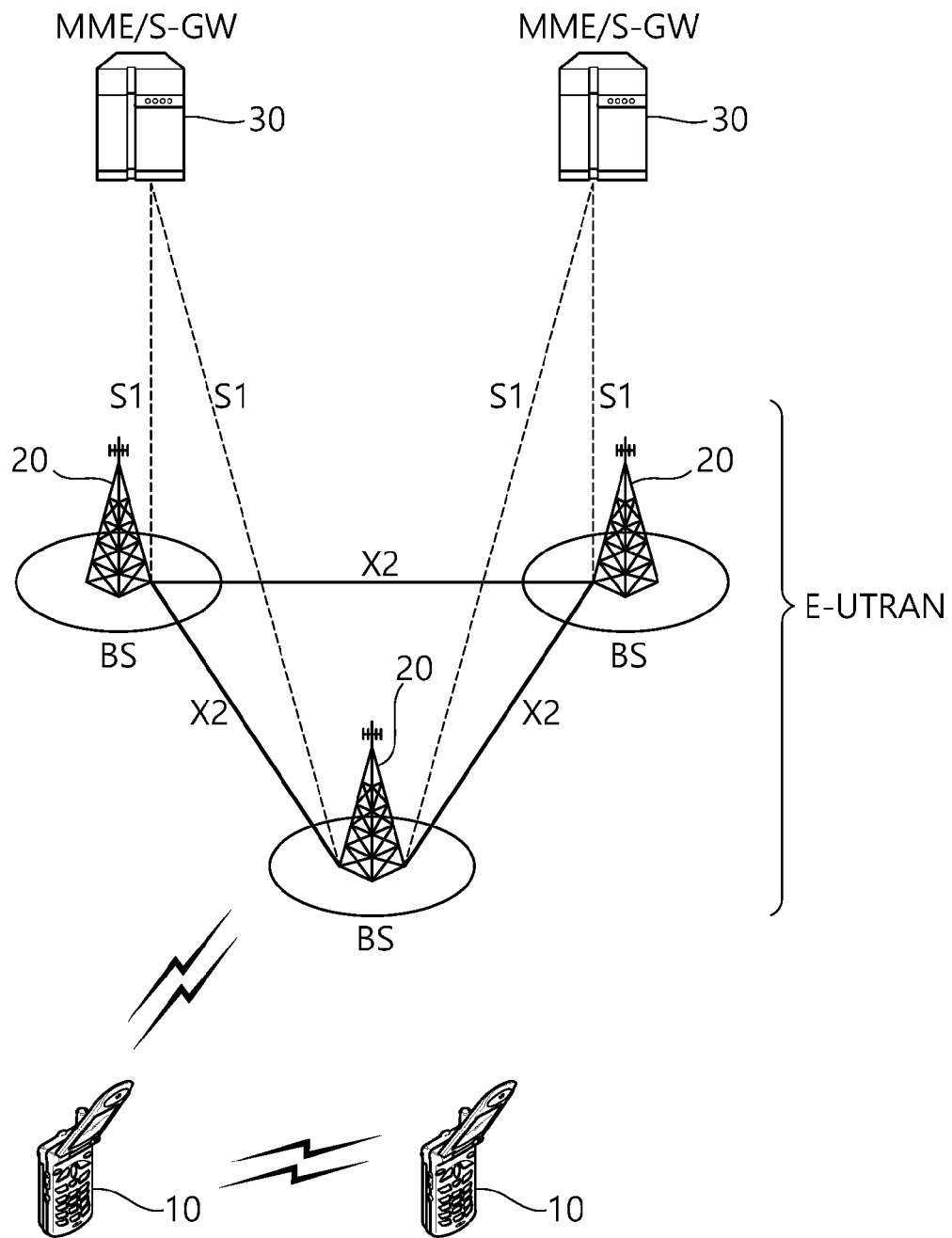

[Fig. 2]
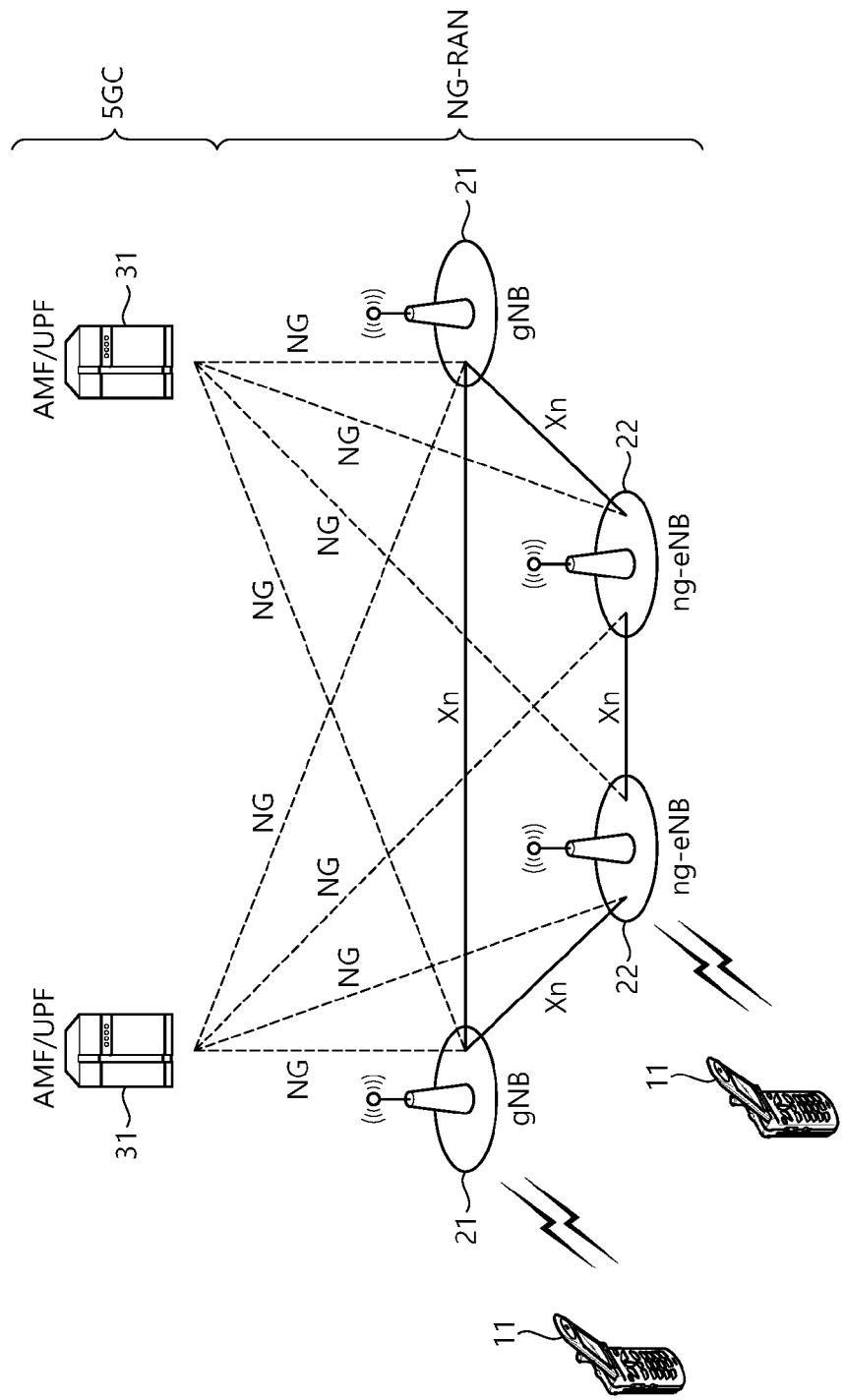

[Fig. 3]
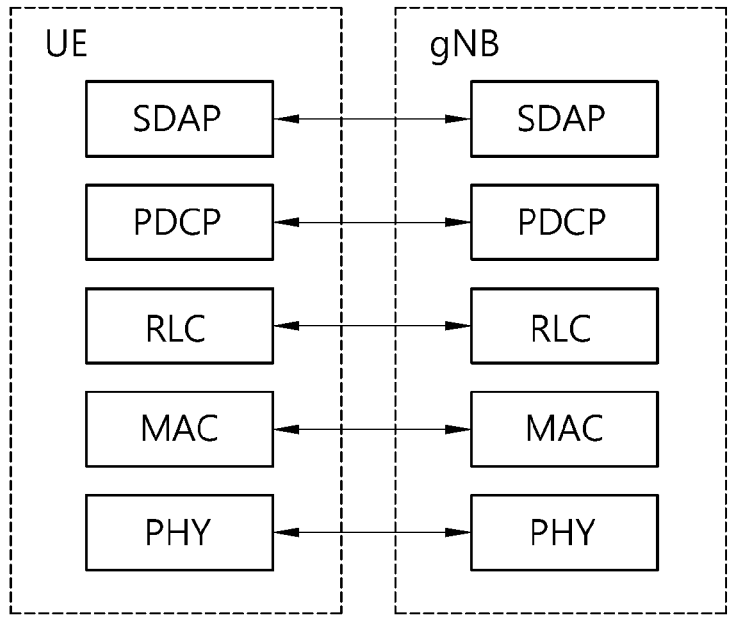
[Fig. 4]
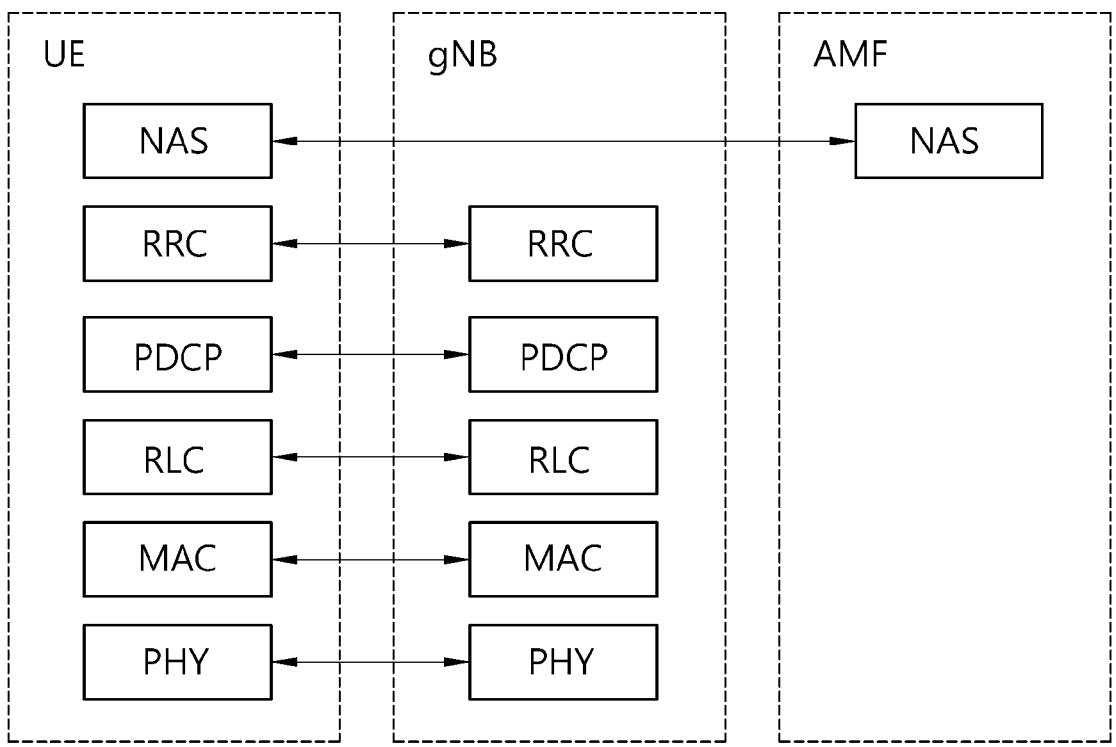

[Fig. 5]
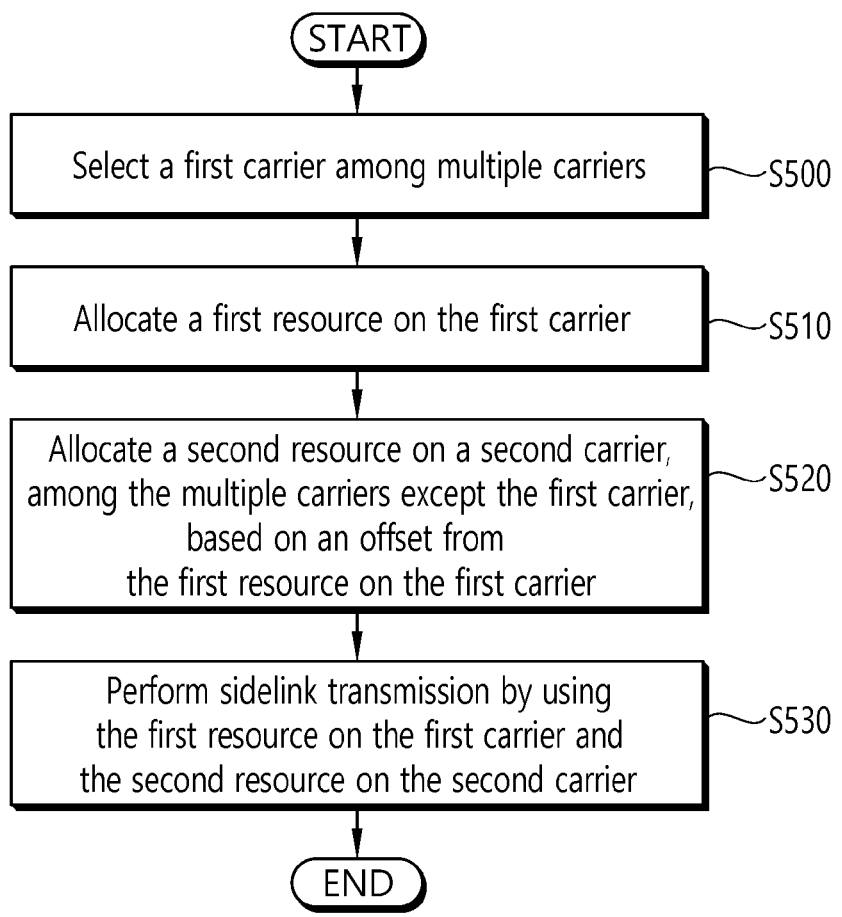

[Fig. 6]
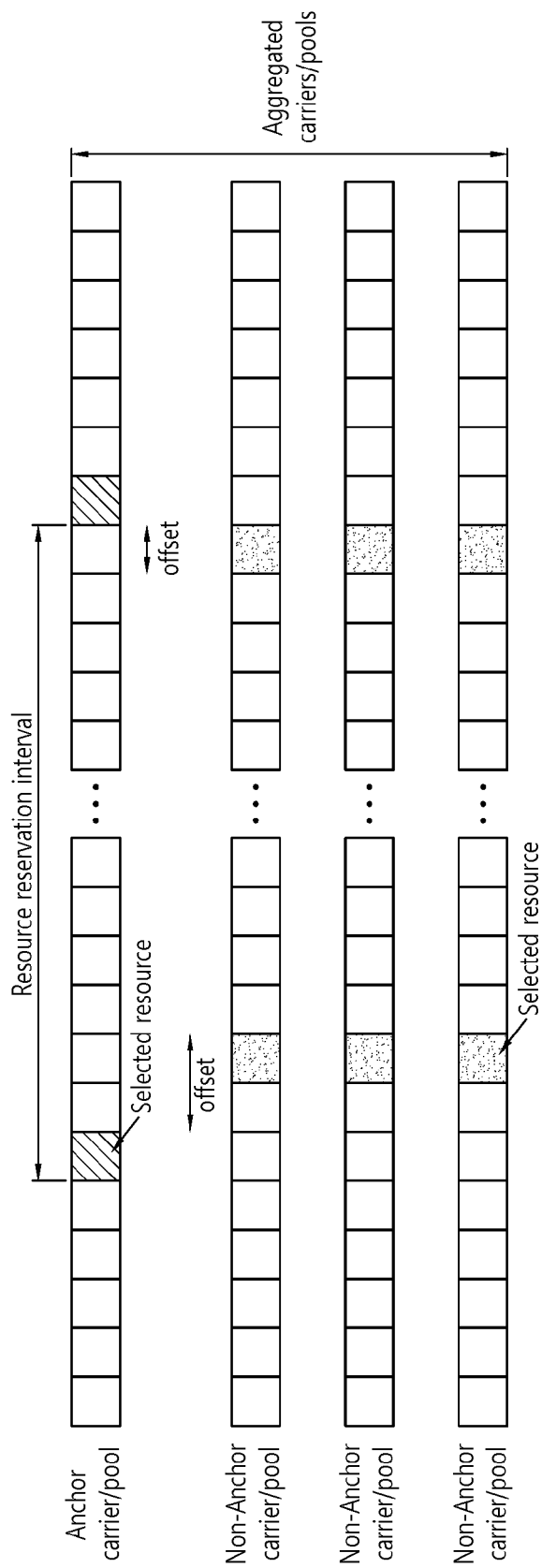

[Fig. 7]
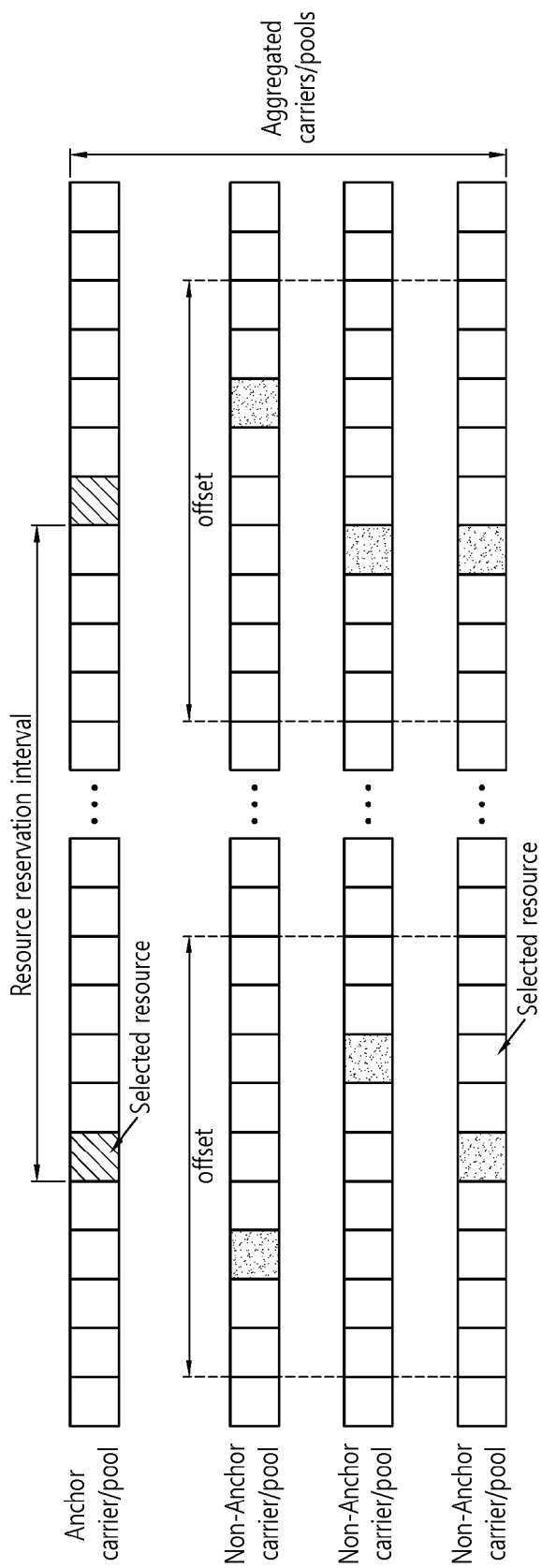

[Fig. 8]
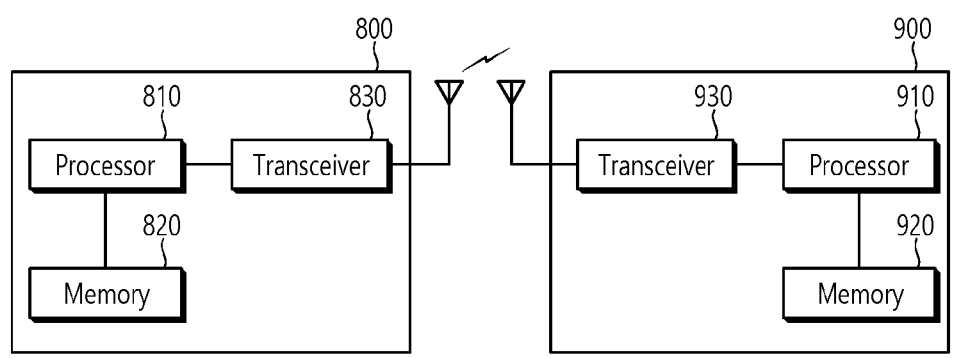

METHOD AND APPARATUS FOR ALLOCATING RESOURCE BASED ON ANCHOR CARRIER IN WIRELESS COMMUNICATION SYSTEM

CROSS-REFERENCE TO RELATED APPLICATIONS

This application is the National Stage filing under 35 U.S.C. 371 of International Application No. PCT/KR2018/008369, filed on Jul. 24, 2018, which claims the benefit of U.S. Provisional Application No. 62/536,982, filed on Jul. 25, 2017, the contents of which are all hereby incorporated by reference herein in their entirety.

TECHNICAL FIELD

The present invention relates to wireless communications, and more particularly, to a method and apparatus for allocating a resource based on an anchor carrier in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China. 3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

SUMMARY

Carrier aggregation (CA) in sidelink for V2X sidelink communication may be supported. In this case, a method for restricting resources for sidelink transmission on multiple carriers may be required.

In an aspect, a method for allocating resources for a sidelink transmission by a user equipment (UE) in a wireless communication system is provided. The method includes selecting a first carrier among multiple carriers, allocating a first resource on the first carrier, allocating a second resource on a second carrier, among the multiple carriers except the first carrier, based on an offset from the first resource on the first carrier, and performing the sidelink transmission by using the first resource on the first carrier and the second resource on the second carrier.

In another aspect, a user equipment (UE) in a wireless communication system is provided. The UE includes a memory, a transceiver, and a processor, operably coupled to the memory and the transceiver, that selects a first carrier among multiple carriers, allocates a first resource on the first carrier, allocates a second resource on a second carrier, among the multiple carriers except the first carrier, based on an offset from the first resource on the first carrier, and controls the transceiver to perform the sidelink transmission by using the first resource on the first carrier and the second resource on the second carrier.

The same message can be received on multiple carriers/resource pools within a specific offset, so a reception opportunity of a receiving UE can be guaranteed.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows an example of a method for allocating resources for sidelink transmission according to an embodiment of the present invention.

FIG. 6 shows an example of allocation of sidelink resource across multiple carriers/resource pools according to an embodiment of the present invention.

FIG. 7 shows another example of allocation of sidelink resource across multiple carriers/resource pools according to an embodiment of the present invention.

FIG. 8 shows a wireless communication system to implement an embodiment of the present invention.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH. Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signalled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaption applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre)configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Detailed operation by MAC sublayer regarding V2X sidelink communication transmission is described. In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current SC period, the MAC entity shall:
2> using the received sidelink grant determine the set of subframes in which transmission of SCI and transmission of first transport block occur;
2> consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
2> clear the configured sidelink grant at the end of the corresponding SC Period;
1> else, if the MAC entity is configured by upper layers to receive multiple sidelink grants dynamically on the PDCCH and more data is available in STCH than can be transmitted in the current SC period, the MAC entity shall for each received sidelink grant:
2> using the received sidelink grant determine the set of subframes in which transmission of SCI and transmission of first transport block occur;
2> consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
2> clear the configured sidelink grant at the end of the corresponding SC Period;
1> else, if the MAC entity is configured by upper layers to transmit using one or multiple pool(s) of resources and more data is available in STCH than can be transmitted in the current SC period, the MAC entity shall for each sidelink grant to be selected:
2> if configured by upper layers to use a single pool of resources:
3> select that pool of resources for use;
2> else, if configured by upper layers to use multiple pools of resources:
3> select a pool of resources for use from the pools of resources configured by upper layers whose associated priority list includes the priority of the highest priority of the sidelink logical channel in the MAC PDU to be transmitted;
2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;
2> consider the selected sidelink grant to be a configured sidelink grant occurring in those subframes starting at the beginning of the first available SC Period which starts at least 4 subframes after the subframe in which the sidelink grant was selected;
2> clear the configured sidelink grant at the end of the corresponding SC Period.
Sidelink grants are selected as follows for V2X sidelink communication:
1> if the MAC entity is configured to receive a sidelink grant dynamically on the PDCCH and data is available in STCH, the MAC entity shall:
2> use the received sidelink grant to determine the number of HARQ retransmissions and the set of subframes in which transmission of SCI and SL-SCH occur;
2> consider the received sidelink grant to be a configured sidelink grant;
1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:
2> if SL_RESOURCE_RESELECTION_COUNTER=0 and the MAC entity randomly selects, with equal probability, a value in the interval [0, 1] which is above the probability configured by upper layers in probResourceKeep; or
2> if the configured sidelink grant cannot accommodate a RLC SDU by using the maximum allowed MCS configured by upper layers in maxMCS-PSSCH and the MAC entity selects not to segment the RLC SDU; or
2> if a pool of resources is configured or reconfigured by upper layers:
3> clear the configured sidelink grant, if available;
3> randomly select, with equal probability, an integer value in the interval [5, 15] and set SL_RESOURCE_RESELECTION_COUNTER to the selected value;
3> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;
3> select one of the allowed values configured by upper layers in restrictResourceReservationPeriod and set the resource reservation interval by multiplying 100 with the selected value;
3> randomly select one time and frequency resource from the resources indicated by the physical layer. The random function shall be such that each of the allowed selections can be chosen with equal probability;
3> use the randomly selected resource to select a set of periodic resources spaced by the resource reservation interval for transmission opportunities of SCI and SL-SCH corresponding to the number of transmission opportunities of MAC PDUs;
3> if the number of HARQ retransmissions is equal to 1 and there are available resources left in the resources indicated by the physical layer that meet the conditions for more transmission opportunities:

4> randomly select one time and frequency resource from the available resources. The random function shall be such that each of the allowed selections can be chosen with equal probability;
4> use the randomly selected resource to select a set of periodic resources spaced by the resource reservation interval for the other transmission opportunities of SCI and SL-SCH corresponding to the number of retransmission opportunities of the MAC PDUs;
4> consider the first set of transmission opportunities as the new transmission opportunities and the other set of transmission opportunities as the retransmission opportunities;
4> consider the set of new transmission opportunities and retransmission opportunities as the selected sidelink grant.
3> else:
4> consider the set as the selected sidelink grant;
3> use the selected sidelink grant to determine the set of subframes in which transmissions of SCI and SL-SCH occur;
3> consider the selected sidelink grant to be a configured sidelink grant;
2> else if SL_RESOURCE_RESELECTION_COUNTER=0 and the MAC entity randomly selects, with equal probability, a value in the interval [0, 1] which is less than or equal to the probability configured by upper layers in probResourceKeep:
3> clear the configured sidelink grant, if available;
3> randomly select, with equal probability, an integer value in the interval [5, 15] and set SL_RESOURCE_RESELECTION_COUNTER to the selected value;
3> use the previously selected sidelink grant for the number of transmissions of the MAC PDUs with the resource reservation interval to determine the set of subframes in which transmissions of SCI and SL-SCH occur;
3> consider the selected sidelink grant to be a configured sidelink grant;
1> else, if the MAC entity is configured by upper layers to transmit based on either sensing or random selection using a pool of resources, the MAC entity selects to create a configured sidelink grant corresponding to transmission(s) of a single MAC PDU, and data is available in STCH, the MAC entity shall for a Sidelink process:
2> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;
2> if transmission based on random selection is configured by upper layers:
3> randomly select the time and frequency resources for one transmission opportunity of SCI and SL-SCH from the resource pool. The random function shall be such that each of the allowed selections can be chosen with equal probability;
2> else:
3> randomly select the time and frequency resources for one transmission opportunity of SCI and SL-SCH from the resource pool indicated by the physical layer. The random function shall be such that each of the allowed selections can be chosen with equal probability;
2> if the number of HARQ retransmissions is equal to 1:
3> if transmission based on random selection is configured by upper layers and there are available resources that meet the conditions for one more transmission opportunity:
4> randomly select the time and frequency resources for the other transmission opportunity of SCI and SL-SCH corresponding to additional transmission of the MAC PDU from the available resources. The random function shall be such that each of the allowed selections can be chosen with equal probability;
3> else, if transmission based on sensing is configured by upper layers and there are available resources, except the resources already excluded by the physical layer, that meet the conditions for one more transmission opportunity:
4> randomly select the time and frequency resources for the other transmission opportunity of SCI and SL-SCH corresponding to additional transmission of the MAC PDU from the available resources. The random function shall be such that each of the allowed selections can be chosen with equal probability;
3> consider a transmission opportunity which comes first in time as the new transmission opportunity and a transmission opportunity which comes later in time as the retransmission opportunity;
3> consider both of the transmission opportunities as the selected sidelink grant;
2> else:
3> consider the transmission opportunity as the selected sidelink grant;
2> use the selected sidelink grant to determine the subframes in which transmission(s) of SCI and SL-SCH occur;
2> consider the selected sidelink grant to be a configured sidelink grant;
The MAC entity shall for each subframe:
1> if the MAC entity has a configured sidelink grant occurring in this subframe:
2> if the configured sidelink grant corresponds to transmission of SCI:
3> instruct the physical layer to transmit SCI corresponding to the configured sidelink grant;
3> for V2X sidelink communication, deliver the configured sidelink grant and the associated HARQ information to the Sidelink HARQ Entity for this subframe;
2> else if the configured sidelink grant corresponds to transmission of first transport block for sidelink communication:
3> deliver the configured sidelink grant and the associated HARQ information to the Sidelink HARQ Entity for this subframe.

Sidelink communication and V2X sidelink communication related identities are described. The following identities are used for sidelink communication and V2X sidelink communication.

(1) Source layer-2 ID (may be referred to as Source ID): The Source Layer-2 ID identifies the sender of the data in sidelink communication and V2X sidelink communication. The Source Layer-2 ID is 24 bits long and is used together with Destination Layer-2 ID and logical channel ID (LCID) for identification of the RLC UM entity and PDCP entity in the receiver.

(2) Destination Layer-2 ID (may be referred to as Destination ID): The Destination Layer-2 ID identifies the target of the data in sidelink communication and V2X sidelink communication. For sidelink communication, the Destination Layer-2 ID is 24 bits long and is split in the MAC layer into two bit strings. One bit string is the least significant bit (LSB) part (8 bits) of Destination Layer-2 ID and forwarded to physical layer as Group Destination ID. This identifies the target of the intended data in sidelink control information and is used for filtering of packets at the physical layer. Second bit string is the most significant bit (MSB) part (16 bits) of the Destination Layer-2 ID and is carried within the MAC header. This is used for filtering of packets at the MAC layer. In case of V2X sidelink communication, Destination Layer-2 ID is not split and is carried within the MAC header.

No AS signaling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, the ProSe UE ID provided by higher layer is used directly as the Source Layer-2 ID or the Destination Layer-2 ID in the MAC layer. In case of V2X sidelink communication, higher layer provides Source Layer-2 ID and Destination Layer-2 ID.

SPS is described in detail. As mentioned above, resources allocated by SPS may be used for V2X sidelink communication.

In DL, E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

In UL, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined physical resource blocks (PRBs) according to the pre-defined modulation and coding scheme (MCS). Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Table 1 shows SPS-Config information element (IE). The IE SPS-Config is used to specify the SPS configuration.

TABLE 1

```
-- ASN1START
SPS-Config ::= SEQUENCE {
        semiPersistSchedC-RNTI              C-RNTI
            OPTIONAL,               -- Need OR
        sps-ConfigDL                        SPS-ConfigDL
            OPTIONAL,               -- Need ON
        sps-ConfigUL                        SPS-ConfigUL
            OPTIONAL                -- Need ON
}
SPS-Config-v1430 ::=    SEQUENCE {
        ul-SPS-V-RNTI-r14                   C-RNTI
            OPTIONAL,               -- Need OR
        sl-SPS-V-RNTI-r14                   C-RNTI
            OPTIONAL,               -- Need OR
        sps-ConfigUL-ToAddModList-r14       SPS-ConfigUL-ToAddModList-
r14     OPTIONAL,    -- Need ON
        sps-ConfigUL-ToReleaseList-r14      SPS-ConfigUL-ToReleaseList-
r14     OPTIONAL,    -- Need ON
        sps-ConfigSL-ToAddModList-r14       SPS-ConfigSL-ToAddModList-
r14     OPTIONAL,    -- Need ON
        sps-ConfigSL-ToReleaseList-r14   SPS-ConfigSL-ToReleaseList-r14
            OPTIONAL     -- Need ON
}
SPS-ConfigUL-ToAddModList-r14 ::= SEQUENCE (SIZE (1..maxConfigSPS-r14)) OF
SPS-ConfigUL
SPS-ConfigUL-ToReleaseList-r14 ::= SEQUENCE (SIZE (1..maxConfigSPS-r14)) OF
SPS-ConfigIndex-r14
SPS-ConfigSL-ToAddModList-r14 ::= SEQUENCE (SIZE (1..maxConfigSPS-r14)) OF
SPS-ConfigSL-r14
SPS-ConfigSL-ToReleaseList-r14 ::= SEQUENCE (SIZE (1..maxConfigSPS-r14)) OF
SPS-ConfigIndex-r14
SPS-ConfigDL ::=        CHOICE{
        release                             NULL,
        setup                               SEQUENCE {
            semiPersistSchedIntervalDL      ENUMERATED {
        sf10, sf20, sf32, sf40, sf64, sf80,
        sf128, sf160, sf320, sf640, spare6,
        spare5, spare4, spare3, spare2,
        spare1},
            numberOfConfSPS-Processes       INTEGER (1..8),
            n1PUCCH-AN-PersistentList       N1PUCCH-AN-
PersistentList,
            ...,
            [[      twoAntennaPortActivated-r10     CHOICE {
                        release
NULL,
                        setup
SEQUENCE {
                                n1PUCCH-AN-PersistentListP1-r10
N1PUCCH-AN-PersistentList
                        }
                }                               OPTIONAL -- Need
ON
            ]]
        }
}
SPS-ConfigUL ::=    CHOICE {
        release                             NULL,
        setup                               SEQUENCE {
            semiPersistSchedIntervalUL      ENUMERATED {
        sf10, sf20, sf32, sf40, sf64, sf80,
        sf128, sf160, sf320, sf640, sf1-v1430,
        sf2-v1430, sf3-v1430, sf4-v1430, sf5-v1430,
        spare1 },
            implicitReleaseAfter            ENUMERATED {e2,
e3, e4, e8},
            p0-Persistent                           SEQUENCE {
                p0-NominalPUSCH-Persistent          INTEGER
(-126..24),
                pO-UE-PUSCH-Persistent
        INTEGER (-8..7)
            }           OPTIONAL,
                                -- Need OP
            twoIntervalsConfig
ENUMERATED {true}           OPTIONAL, -- Cond TDD
            ...,
            [[      pO-PersistentSubframeSet2-r12   CHOICE {
                        release
NULL,
```

TABLE 1-continued

```
                      setup
    SEQUENCE {
                              p0-NominalPUSCH-PersistentSubframeSet2-r12
            INTEGER (–126..24),
                              p0-UE-PUSCH-PersistentSubframeSet2-r12
                INTEGER (–8..7)
                    }
                }
                                              OPTIONAL -- Need ON
        ]],
        [[       numberOfConfUlSPS-Processes-r13
    INTEGER (1..8)                  OPTIONAL       -- Need OR
        ]],
        [[       fixedRV-NonAdaptive-r14
        ENUMERATED {true}               OPTIONAL,       -- Need OR
                sps-ConfigIndex-r14
        SPS-ConfigIndex-r14             OPTIONAL,       -- Need OR
                semiPersistSchedIntervalUL-v1430
        ENUMERATED {
        sf50, sf100, sf200, sf300, sf400, sf500,
        sf600, sf700, sf800, sf900, sf1000, spare5,
        spare4, spare3, spare2, spare1}   OPTIONAL    -- Need OR
                ]]
            }
}
SPS-ConfigSL-r14 ::=    SEQUENCE {
        sps-ConfigIndex-r14                     SPS-ConfigIndex-r14,
        semiPersistSchedIntervalSL-r14 ENUMERATED {
                                                                        sf20,
sf50, sf100, sf200, sf300, sf400,
                                                                        sf500,
sf600, sf700, sf800, sf900, sf1000,
                                                                        spare4,
spare3, spare2, spare1}
}
SPS-ConfigIndex-r14 ::=             INTEGER (1..maxConfigSPS-r14)
N1PUCCH-AN-PersistentList ::=       SEQUENCE (SIZE (1..4)) OF INTEGER
(0..2047)
-- ASN1STOP
```

A problem of the prior art or a problem to be solved is described. According to the prior art, a resource pool is configured only on a single carrier. The RRC layer of the UE (hereinafter, simply UE RRC) selects a resource pool on a single carrier. Then, the MAC layer of the UE (hereinafter, simply UE MAC) performs resource (re-)selection on the selected pool, and performs sidelink transmission by using the selected resource.

It has been discussed to introduce carrier aggregation (CA) in sidelink for V2X sidelink communication. CA in sidelink for V2X sidelink communication may apply to both in coverage UEs and out of coverage UEs. In CA in sidelink for V2X sidelink communication, each resource pool (pre) configured for V2X sidelink communication transmission or reception may be associated to a single carrier.

If CA in sidelink for V2X sidelink communication is introduced, the UE may perform parallel transmissions on different carriers. Accordingly, the UE may select resources on each carrier/resource pool independently. In this case, the UE may perform parallel sidelink transmissions of the same message in different subframes of different sidelink carriers with a long interval. Such parallel transmissions may reduce reception opportunities of the receiving UE, which may intend to receive V2X transmissions from other UEs.

Hereinafter, a method for selecting/allocating a resource based on an anchor carrier is described according to embodiments of the present invention.

FIG. 5 shows an example of a method for allocating resources for sidelink transmission according to an embodiment of the present invention. Before step S500 of FIG. 5, UE RRC may receive multiple resource pools from the network and selects one or more resource pools among the received multiple resource pools. The network may indicate to the UE which resource pools can be aggregated in sidelink. In this case, the UE may select one or more resource pools only among the indicated resource pools. Or, the network may indicate to the UE which carriers can be aggregated in sidelink. In this case, the UE may select one or more resource pools among the resource pools configured on any of the indicated carriers. UE RRC may inform UE MAC of the selected resource pools and/or the carriers of the selected resource pools (e.g. each carrier of the selected resource pool).

In step S500, the UE selects a first carrier among multiple carriers. Specifically, UE MAC may select one carrier among the carriers of the resource pools given by UE RRC. Alternatively, UE MAC may select one resource pool among the resource pools given by UE RRC and then selects one carrier of the selected resource pool. The first carrier, i.e. the selected carrier, may be called as an anchor carrier. The other carriers of the resource pools given by UE RRC than the anchor carrier may be called as a non-anchor carrier. If one resource pool is selected among the resource pools given by UE RRC, the selected resource pool may be called as an anchor resource pool. The other resource pool given by UE RRC than the anchor resource pool may be called as a non-anchor resource pool. If the anchor resource pool is configured with more than carriers, one carrier may be the anchor carrier and the other carriers may be non-anchor carriers.

UE MAC may select the anchor carrier or the anchor resource pool according to one of the following options.

Option 1: UE MAC may select the anchor carrier or the anchor resource pool which is indicated by the network.

Option 2: UE MAC may randomly select the anchor carrier among the carriers of the resource pool or the anchor resource pool among the resource pools.

Option 3: UE MAC may select the anchor carrier among the carriers of the resource pool or the anchor resource pool among the resource pools, based on UE identity such as C-RNTI.

Option 4: UE MAC may select the anchor carrier among the carriers of the resource pool or the anchor resource pool among the resource pools, based on Source ID (e.g. Source Layer 2 ID).

Option 5: UE MAC may select the anchor carrier among the carriers of the resource pool or the anchor resource pool among the resource pools, based on Destination ID (e.g. Destination Layer 2 ID).

Option 6: UE MAC may select the anchor carrier among the carriers of the resource pool or the anchor resource pool among the resource pools, based on CBR values of the carriers/resource pools. UE MAC may select one carrier or one resource pool with the lowest CBR value or with a CBR value below a threshold which is indicated by the network.

In step S510, the UE allocates a first resource on the first carrier (i.e. anchor carrier). Specifically, the network may allocate the time and frequency resources of the anchor carrier or the anchor resource pool to the UE with an offset. The offset may be used to allocate time and frequency resources to the non-anchor carrier or the non-anchor resource pool based on time and frequency resources of the anchor carrier or the anchor resource pool in step S520, which will be described below. The offset may be a time offset and/or a frequency offset compared to the selected time and frequency resources of the anchor carrier. The offset may be configured by the network. The offset may be indicated by one of PDCCH, a MAC control element (CE) or a RRC message. The offset may not be applied if it is not configured by the network.

Alternatively, UE MAC may randomly select the time and frequency resources of the anchor carrier or the anchor resource pool from the resources indicated by the physical layer. The physical layer may perform sensing on the anchor carrier or the anchor resource pool, and then, may select the resources indicated to UE MAC based on results of sensing.

In step S520, the UE allocates a second resource on a second carrier (i.e. non-anchor carrier), among the multiple carriers except the first carrier (i.e. anchor carrier), based on an offset from the first resource on the first carrier (i.e. anchor carrier). That is, UE MAC applies the time and frequency resources of the anchor carrier to each non-anchor carrier with an offset. The physical layer may perform sensing on the non-anchor carrier or the non-anchor resource pool, and then may select the resources indicated to UE MAC based on results of sensing.

UE MAC may select the time and frequency resources of each non-anchor carrier with the offset according to one of the following options.

Option 1: UE MAC may select the time and frequency resources of each non-anchor carrier with a fixed offset compared to the sidelink grant of the anchor carrier from the resources indicated by the physical layer. The offset may be same for all non-anchor carriers. Alternatively, the offset may be different for different non-anchor carriers. The offset may be zero. In this case, the selected time and frequency resources may be aligned for all aggregated/selected carriers. Or, the offset may change in every resource reservation interval.

Option 2: UE MAC may randomly select the time and frequency resources of each non-anchor carrier within the offset compared to the sidelink grant of the anchor carrier from the resources indicated by the physical layer.

In step S530, the UE performs sidelink transmission by using the first resource on the first carrier and the second resource on the second carrier. That is, the UE performs sidelink transmissions on the selected time and frequency resources of the selected carriers or the carriers of the selected resource pools.

Details of sidelink resource reservation for sidelink transmissions over multiple carriers is described below.

The physical layer may perform sensing on the anchor carrier or the anchor resource pool, and then, may select the resources indicated to UE MAC based on results of sensing. UE MAC may randomly select the time and frequency resources of the anchor carrier or the anchor resource pool from the resources indicated by the physical layer. The UE may consider the selected resources as the sidelink grant.

Then, UE MAC may apply the selected time and frequency resources of the anchor carrier to each non-anchor carrier with an offset. The offset may be a time offset and/or a frequency offset compared to the selected time and frequency resources of the anchor carrier. The offset may be configured by the network. The offset may not be applied if it is not configured by the network.

The physical layer may perform sensing on the non-anchor carrier or the non-anchor resource pool, and then, may select the resources indicated to UE MAC based on results of sensing. UE MAC may select the time and frequency resources of each non-anchor carrier with the offset compared to the sidelink resource (i.e. sidelink grant) of the anchor carrier from the resources indicated by the physical layer.

FIG. 6 shows an example of allocation of sidelink resource across multiple carriers/resource pools according to an embodiment of the present invention. The offset may be same for some or all non-anchor carriers. In FIG. 6, the offset is same for all non-anchor carriers. That is, resources of non-anchor carriers are selected from a selected resource of an anchor carrier/resource pool in a first resource reservation interval with the same offset. Accordingly, the selected resources of non-anchor carriers are aligned for all non-anchor carriers. Furthermore, in FIG. 6, the offset can changes in every resource reservation interval.

The offset may be same for non-anchor carriers of the same frequency band. The offset may be different for non-anchor carriers of different frequency bands. The network may provide the maximum offset value and the minimum offset value. Then, the UE may choose one offset value between the maximum offset value and the minimum offset value. The offset may be zero. Namely, the selected time and frequency resources are aligned for all aggregated/selected carriers. The UE may apply this approach for all non-anchor carriers in the same frequency band, in order to increase opportunities of receiving sidelink transmissions on the non-anchor carriers.

FIG. 7 shows another example of allocation of sidelink resource across multiple carriers/resource pools according to an embodiment of the present invention. In FIG. 7, UE MAC selects the time and frequency resources of each non-anchor carrier within the offset from the resources indicated by the physical layer. Thus, UE MAC may randomly select any time and frequency resource within the offset. The network may provide the maximum offset value and the minimum offset value. Then, the UE may choose one offset value between the maximum offset value and the minimum offset value for each non-anchor carrier. The UE may apply this approach for all non-anchor carriers in different frequency bands, in order to avoid a situation requiring more than maximum UE transmission power.

UE MAC may use the CBR value of each non-anchor carrier/pool or the total CBR value of a combination of non-anchor carriers/pools. Thus, if configured by the network, the offset applied to one or more non-anchor carriers may change according to the CBR value of a non-anchor carrier. For example, if CBR is low, the UE may choose a low offset value. If CBR is high, the UE may choose a high offset value.

Mapping between a CBR value and the offset may be configured by the network. Alternatively, the offset indicated by the network may be scaled down or up according to the CBR value. The UE may apply the scaled offset for resource selection/reselection as described above.

Alternatively, as shown in step S510 of FIG. 5, the network may allocate the time and frequency resources of the anchor carrier or the anchor resource pool to the UE. The time and frequency resources of the anchor carrier or the anchor resource pool may be allocated by one of PDCCH, a MAC CE or a RRC message. The network may also indicate an offset to the UE. The offset may also be indicated by one of PDCCH, a MAC CE or a RRC message. Then, UE MAC may apply the time and frequency resources to the non-anchor carrier or the non-anchor resource pool with the offset as described above.

In the description above, a resource pool may be replaced by a SPS configuration or a set of allocated resources of a SPS configuration.

FIG. 8 shows a wireless communication system to implement an embodiment of the present invention.

A UE 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910.

The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for allocating resources for a sidelink transmission by a user equipment (UE) in a wireless communication system, the method comprising:
selecting a first carrier among multiple carriers;
allocating a first resource on the first carrier;
allocating a second resource on a second carrier, among the multiple carriers except the first carrier, based on an offset from the first resource on the first carrier; and
performing the sidelink transmission by using the first resource on the first carrier and the second resource on the second carrier.

2. The method of claim 1, wherein the offset is configured by a network.

3. The method of claim 1, wherein the offset is one of a time offset or a frequency offset.

4. The method of claim 1, wherein the second resource is allocated from the first resource by the offset, and
wherein the offset is fixed.

5. The method of claim 4, wherein the offset is same for carriers among the multiple carriers except the first carrier.

6. The method of claim 4, wherein the offset is different for carriers among the multiple carriers except the first carrier.

7. The method of claim 4, wherein the offset is same for carriers in a same frequency band.

8. The method of claim 4, wherein the offset is different for carriers in different frequency bands.

9. The method of claim 4, wherein the offset changes in every resource reservation interval.

10. The method of claim 1, wherein the second resource is randomly allocated within an interval from the first resource on the first carrier by the offset.

11. The method of claim 1, wherein the offset is a value which is selected between a maximum offset value and a minimum offset value.

12. The method of claim 11, wherein the maximum offset value and the minimum value is configured by a network.

13. The method of claim 1, wherein the offset changes according to a channel busy ratio (CBR) of the second carrier.

14. The method of claim 1, wherein the first resource is configured by a network.

15. The method of claim 1, wherein the UE is in communication with at least one of a mobile device, a network, and/or autonomous vehicles other than the UE.

16. A user equipment (UE) in a wireless communication system, the UE comprising:
- a memory;
- a transceiver; and
- a processor, operably coupled to the memory and the transceiver, that:
- selects a first carrier among multiple carriers;
- allocates a first resource on the first carrier;
- allocates a second resource on a second carrier, among the multiple carriers except the first carrier, based on an offset from the first resource on the first carrier; and
- controls the transceiver to perform the sidelink transmission by using the first resource on the first carrier and the second resource on the second carrier.

\* \* \* \* \*